(12) United States Patent
Hirota (10) Patent No.: US 8,362,397 B2
(45) Date of Patent: Jan. 29, 2013

(54) ARC START CONTROL METHOD

(75) Inventor: Shugo Hirota, Osaka (JP)

(73) Assignee: Daihen Corporation, Osaka (JP)

( * ) Notice: Subject to any disclaimer, the term of this patent is extended or adjusted under 35 U.S.C. 154(b) by 334 days.

(21) Appl. No.: 12/682,741

(22) PCT Filed: Nov. 21, 2008

(86) PCT No.: PCT/JP2008/071240
§ 371 (c)(1),
(2), (4) Date: Apr. 12, 2010

(87) PCT Pub. No.: WO2009/072407
PCT Pub. Date: Jun. 11, 2009

(65) Prior Publication Data
US 2010/0213181 A1     Aug. 26, 2010

(30) Foreign Application Priority Data

Dec. 3, 2007  (JP) .................................. 2007-312543

(51) Int. Cl.
*B23K 9/133* (2006.01)
(52) U.S. Cl. .............................. 219/137.71; 219/130.21
(58) Field of Classification Search ............ 219/130.31, 219/130.21, 137.71, 137.7
See application file for complete search history.

(56) References Cited

U.S. PATENT DOCUMENTS 7,301,124 B2 * 11/2007 Kaufman ................. 219/137.71

FOREIGN PATENT DOCUMENTS

| JP | 61-014080    | 1/1986  |
|----|--------------|---------|
| JP | 07-060439    | 3/1995  |
| JP | 09-295143    | 11/1997 |
| JP | 10-272569    | 10/1998 |
| JP | 2002-248572 A| 9/2002  |
| JP | 2006-231414  | 9/2006  |
| JP | 2007-030018  | 2/2007  |
| JP | 2008-200693  | 9/2008  |

OTHER PUBLICATIONS

Translation of the International Preliminary Report on Patentability, dated Aug. 10, 2010, issued in priority Application No. PCT/JP2008/071240.
International Search Report, dated Jan. 20, 20009, issued in priority International Application No. PCT/ JP2008/071240.
Extended European Search Report, dated Aug. 24, 2012, issued in corresponding European Application No. EP 08856011.
Office Action, dated Oct. 23, 2012, issued in corresponding Japanese Application No. 2009-544632.

* cited by examiner

*Primary Examiner* — David Lam
(74) *Attorney, Agent, or Firm* — Saul Ewing LLP (57) ABSTRACT

An arc start control method comprises starting advance of a welding wire, and determining that a distal end of a welding wire contacts a base material and short circuit is caused. If a feed torque value is a reference torque value or greater, the welding wire is retracted and the distal end of the welding wire is separated from the base material without generating an arc. If the feed torque value is smaller than the reference torque value the welding wire is retracted and the distal end of the welding wire is separated from the base material and an initial arc is generated between the welding wire and the base material.

3 Claims, 6 Drawing Sheets

ARC START CONTROL METHOD

CROSS-REFERENCE TO RELATED APPLICATIONS

This application claims the priority of International Application PCT/JP2008/071240, filed Nov. 21, 2008, which claims priority to Japanese Application No. 2007-312543, filed Dec. 3, 2007, the entire contents of which are hereby incorporated herein by reference.

FIELD OF THE INVENTION

The present invention relates to improvement of a retract arc start control method that generates an initial arc to start consumable electrode arc welding by lifting a welding wire from a base material after causing the welding wire to contact the base material, and switches the initial arc to an arc of a steady state after lifting the welding wire continuously with the initial arc maintained.

BACKGROUND OF THE INVENTION

Figure 5:
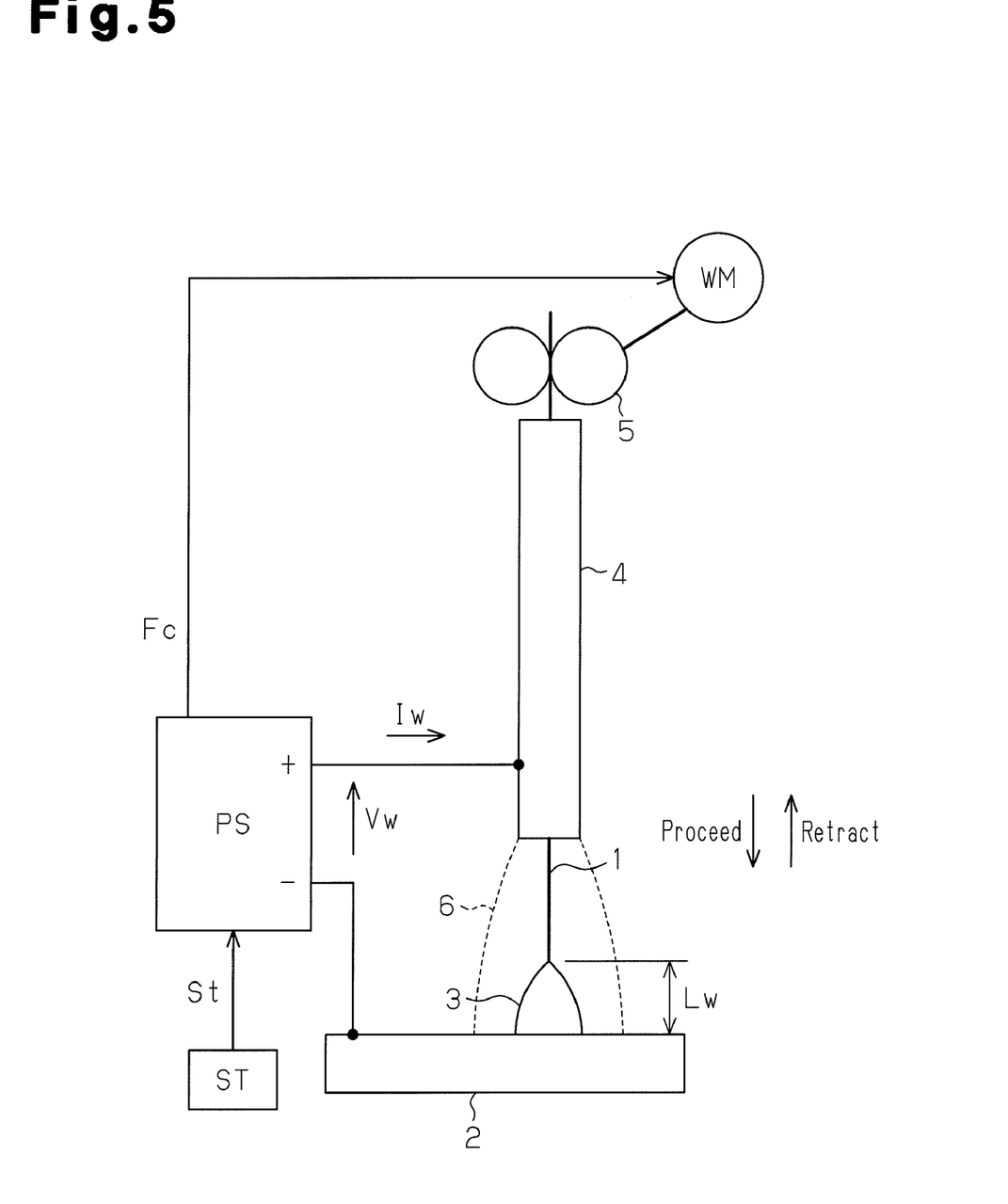
FIG. 5 is a block diagram representing a conventional consumable electrode arc welding apparatus.

As illustrated in FIG. 5, a welding start circuit ST is arranged outside of a welding power source PS. When receiving a welding start signal St from the welding start circuit ST, the welding power source PS outputs a welding voltage Vw and a welding current Iw to generate an arc and a feed control signal Fc to control the feed of a welding wire 1. As the welding start circuit ST, a program logic controller (PLC), which controls welding steps, and a robot controller may be employed. A feed roll 5 is connected to a wire feed motor WM. The welding wire 1 is fed to a base material 2 via the interior of a welding torch 4 through rotation of the feed roll 5. An arc 3 is generated between the welding wire 1 and the base material 2 in a shielded state by shield gas 6. When the wire feed motor WM rotates in a forward direction, the welding wire 1 is sent in a direction toward the base material 2 and is thus advanced. In contrast, when the wire feed motor WM rotates in a reverse direction, the welding wire 1 is moved in a direction separating from the base material 2 and thus retracted. A welding torch 4 is mounted to a robot body (not shown), an automatic carriage (not shown) or other devices. The welding torch 4 is moved in a three dimensional direction to perform welding.

When the welding wire 1 and the base material 2 are held in contact (short-circuited) or an arc is generated, the welding current Iw flows between the welding wire 1 and the base material 2. Contrastingly, when the welding wire 1 and the base material 2 are separate from each other and the current state is a no-load state in which the arc 3 is not generated, the welding voltage Vw becomes a maximum value (a no-load voltage) and the welding current Iw does not flow between the welding wire 1 and the base material 2. The distance between the distal end of the welding wire 1 and the base material 2 is a wire distal end/base material distance Lw [mm]. Accordingly, the wire distal end/base material distance Lw is substantially equal to the arc length when an arc is generated. In the following explanation, physical contact of the distal end of the welding wire 1 with the base material 2 will be referred to as contact, and electrical connection between the distal end of the welding wire 1 and the base material 2 will be referred to as short circuit. Therefore, in a contact state, the distal end of the wire contacts the base material 2 with being short-circuited or without being short-circuited. If an insulating material (such as slug) is adhered to the distal end of the welding wire 1, the distal end of the welding wire 1 and the base material 2 are not short-circuited even if they contacted each other. If insulating material has been removed from the distal end of the welding wire 1, the distal end of the welding wire 1 and the base material 2 are short-circuited if they contact each other.

Figure 6:
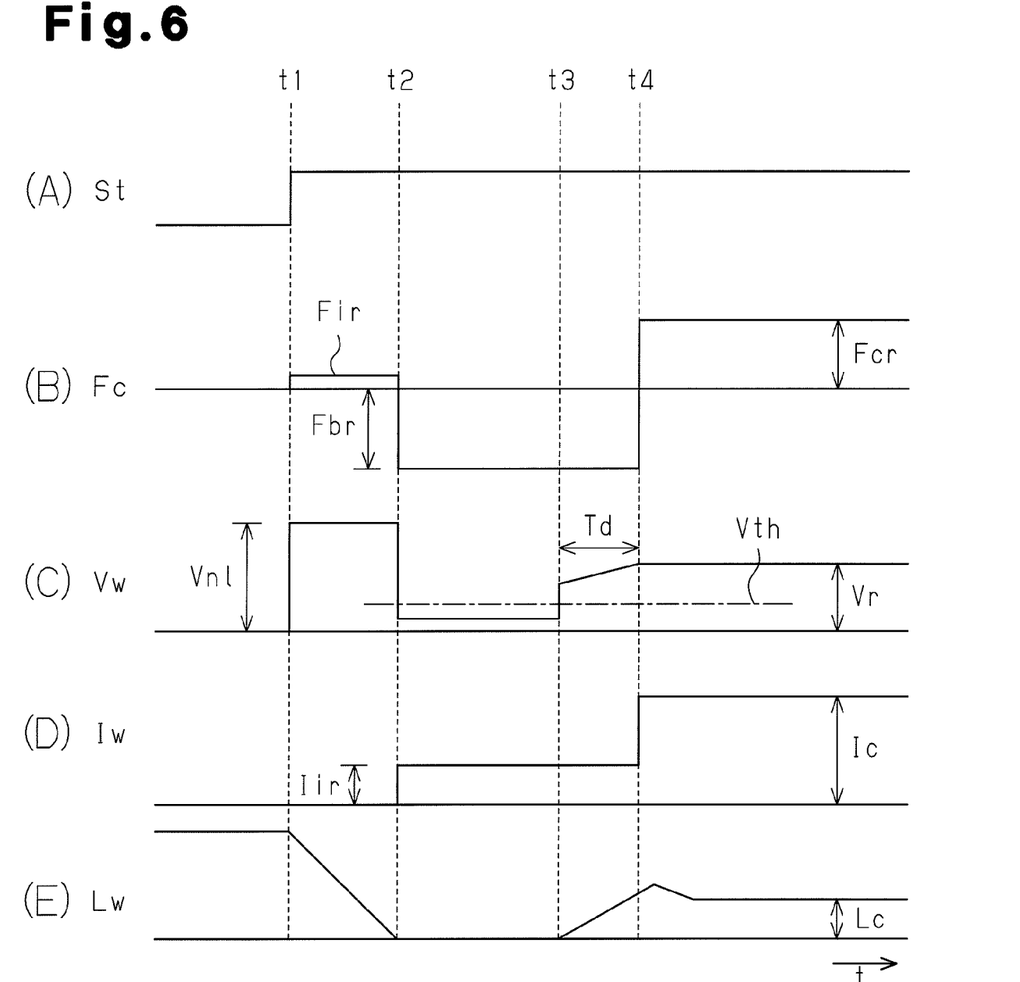
FIG. 6 is a timing chart representing a conventional arc start control method.

FIG. 6 includes timing charts representing a conventional retract arc start control method performed by the welding apparatus illustrated in FIG. 5. FIG. 6(A) represents the welding start signal St, and FIG. 6(B) represents the feed control signal Fc. FIG. 6(C) represents the welding voltage Vw, and FIG. 6(D) represents the welding current Iw. FIG. 6(E) represents the wire distal end/base material distance Lw. The retract arc start control method will now be described with reference to FIGS. 6(A) to 6(E).

(1) Wire Slow-Down Period from Time Point t1 to Time Point t2

At time point t1, with reference to FIG. 6(A), the welding start signal St is input and reaches a High level. Then, as represented by FIG. 6(B), the feed control signal Fc becomes a slow-down feed speed Fir and the welding wire starts to be advanced. Normally, the slow-down feed speed Fir is set to a slow speed of approximately 1 to 2 m/min. This is because if the slow-down feed speed is raised, physical contact between the welding wire and the base material causes the welding wire to be strongly pressed against the base material and deformed or lifts up the welding torch 4, so that the arc start performance is deteriorated. Simultaneously, output of the welding power source PS is started and, with reference to FIG. 6(C), the welding voltage Vw is applied. Since the state at time point t1 is the non-load state, the welding voltage Vw is set to a non-load voltage Vn1, which is a maximum output voltage value (approximately 70 to 100V). After time point t1, the welding wire is advanced and the wire distal end/base material distance Lw gradually decreases as represented by FIG. 6(E).

(2) Contact Period from Time Point t2 to Time Point t3

When the distal end of the welding wire contacts the base material and is short-circuited at time point t2, the wire distal end/base material distance Lw becomes zero as represented by FIG. 6(E), and the welding voltage Vw becomes a short circuit voltage of approximately several volts as represented by FIG. 6(C). Further, the welding current Iw becomes an initial current setting value Iir (approximately 10 A to 100 A) with reference to FIG. 6(D). At this stage, by detecting the fact that the welding voltage Vw has become smaller than a predetermined reference voltage reference value Vth as represented by FIG. 6(C), it is determined that the welding wire and the base material are short-circuited. Further, at this stage, with reference to FIG. 6(B), the feed control signal Fc becomes a retract feed speed setting value Fbr having a negative value, and thus the welding wire starts to be retracted. However, in the short circuit period from time point t2 to time point t3, as represented by FIG. 6(E), the distal end of the welding wire and the base material are maintained in contact with each other due to a delay time caused by reversal of the rotation of the wire feed motor from the forward direction to the reverse direction or a delay time necessary for retracting the welding wire by a length corresponding to the play of the welding wire in the welding torch. Although the short circuit period varies depending on the type of the wire feed motor and the length of the welding torch, the short circuit period is normally 10 to 100 ms.

(3) Initial Arc Lift Period Td from Time Point t3 to Time Point t4

When the distal end of the welding wire is separated from the base material as represented by FIG. 6(E), a current corresponding to the initial current setting value Iir is supplied and an initial arc is generated. When the initial arc is produced, with reference to FIG. 6(C), the welding voltage Vw reaches an arc voltage of several tens of volts, which is higher than or equal to the reference voltage Vth. In the predetermined initial arc lift period Td (from time point t3 to time point t4), the welding wire is retracted continuously as represented by FIG. 6(B). This is because, if movement of the welding wire is switched from retract to advance immediately after the initial arc has been produced, the wire and the base material may be caused to re-contact with each other due to an insufficient arc length. In order to prevent such re-contact and smoothly switch to a steady arc state, the welding wire is continuously retracted to increase the arc length with the initial arc maintained in the initial arc lift period. The welding wire continues to be retracted until the arc length becomes substantially equal to a steady arc length. The initial current for the initial arc is maintained at the low level in order to prevent the initial arc from melting the distal end of the welding wire and causing the arc to flare up. If the arc flares up when the welding wire is retracted, it is difficult to raise the arc accurately to a desirable value. The current value of the initial current is suppressed to be low to prevent the arc from flaring up. To prevent the re-short circuit, a re-short circuit preventing current that is a short time pulse current may be supplied when the initial arc is caused at time point t3. According to this method, the pulse current of a high current value is supplied to instantly elongate the arc and prevent re-short circuit.

(4) Steady Arc State Period After Time Point t4

When the initial arc lift period Td ends at time point t4, the feed control signal Fc becomes a steady feed speed setting value Fcr as represented by FIG. 6(B) and the welding wire starts to be advanced again. Simultaneously, with reference to FIG. 6(C), the welding voltage Vw is subjected to constant voltage control to become equal to a predetermined voltage set value Vr and, as represented by FIG. 6(D), a steady welding current Ic corresponding to the steady feed speed is supplied. In this manner, with reference to FIG. 6(E), the initial arc generating state is smoothly switched to the steady arc state. In the steady arc state, the arc represents a steady arc length Lc.

In the above-described control method, constant current control is performed on the initial current by the welding power source PS so as to control the current accurately. As represented by FIG. 6(D), the initial current is constant. However, there may be cases in which the current is suppressed to a small value when the welding wire contacts the base material at time point t2 and then increased in the short circuit period. This prevents an arc from being generated, and melting and joining the welding wire and the base material together when the welding wire and the base material are in contact. In this case, the welding wire is advanced or is retracted to move the distal end of the welding wire forward or backward. However, the welding torch may be advanced or retracted to move the distal end of the welding wire forward or backward. Therefore, the distal end of the welding wire is moved forward or backward by moving the welding wire forward or backward or by moving the welding torch forward or backward. Of course, after time point t4, the welding wire is fed to move the welding wire forward again. The above-described conventional art is disclosed in, for example, Patent Documents 1, 2.

In the control method described in FIG. 6, the distal end of the welding wire physically contacts the base material at time point t2, and is simultaneously short-circuited. At this time, the forward movement of the welding wire is suspended immediately and the movement of the welding wire is switched to retracting. Therefore, the welding wire is not strongly pressed against the base material. However, in some cases, an insulating material is adhered to the distal end of the welding wire by the influence of the previous welding. Because of the insulating material, the welding wire and the base material may not be short-circuited even if the distal end of the welding wire and the base material physically contact each other. In such a case, the welding wire is continuously advanced at the slow-down feed speed to press the distal end against the base material. If the insulating material adhered to the distal end of the welding wire is destroyed by the pressing force of the welding wire, the distal end of the welding wire and the base material contact each other and are short-circuited. At this time, if the initial current is supplied to the welding wire and the welding wire is retracted to generate the initial arc in a state where the welding wire is strongly pressed against the base material, following problems are caused.

(1) Since the welding wire flexed on the feed path between the base material and the feed roll is suddenly moved toward the base material, the short circuit is caused again.

(2) Since the welding torch that has been lifted by the reaction force of the pressing force of the welding wire is suddenly moved toward its original position, the short circuit is caused again.

If the re-short circuit is caused at the time of generation of initial arc, the distal end of the welding wire is melted by the initial arc. Therefore, the distal end of the welding wire is melted and joined to the base material together. Once the welding wire and the base material are melted and joined together, a high current of several hundreds of amperes needs to be supplied to cancel the state of the melting and joining. In this case, arc start that generates many spatters is caused. This phenomenon is particularly remarkable in case of stainless steel. In the following explanation, such a phenomenon is referred to as re-short circuit caused by cancelling pressing force of the welding wire.

As described above, even if the re-short circuit preventing current is supplied at the time of generation of the initial arc, the flexed welding wire is suddenly moved toward the material to be welded, or the lifted torch suddenly moves toward its original position at a speed higher than the welding wire melting speed by the re-short circuit preventing current. This causes re-short circuit. Accordingly, in the prior art, it is difficult to prevent re-short circuit due to the removal of the pressing force of the welding wire.

Patent Document 1: Japanese Laid-Open Patent Publication No. 2006-231414

Patent Document 2: Japanese Laid-Open Patent Publication No. 2007-30018

SUMMARY OF THE INVENTION

Accordingly, it is an objective of the present invention to provide an arc start control method that prevents re-short circuit due to removal of pressing force of a welding wire, and improves the arc start performance.

To solve the above problems, a first aspect of the present invention provides an arc start control method comprising step 1 for driving a wire feed motor to starting advancing a welding wire, step 2 for determining that a distal end of the welding wire contacts a base material due to advance of the welding wire and short circuit is caused between the welding wire and the base material, step 3 for detecting a feed torque value of the wire feed motor as a short circuit determination torque value at the time of determination of short circuit and proceeding to step 4 if the short circuit determination torque value is a reference torque value or greater, and proceeding to step 5 if the short circuit determination torque value is smaller than the reference torque value, step 4 for starting retracting the welding wire and separating the distal end of the welding wire from the base material without generating an arc and returning to step 1, step 5 for starting retracting the welding wire and separating the distal end of the welding wire from the base material and generating an initial arc between the welding wire and the base material, step 6 for continuing retracting the welding wire while maintaining the initial arc to elongate an arc length, and step 7 for stopping retracting the welding wire and starting advancing of the welding wire to change a state of the arc from the initial arc to a steady arc.

According to the control method, even if an insulating material is adhered to the distal end of the welding wire, the tensed welding wire is relaxed or the lifted welding torch is lowered by retracting the welding wire when the torque value of the wire feed motor is the reference torque value or greater at the time of determination of the short circuit. Therefore, re-short circuit is prevented from occurring due to removal of the pressing force of the welding wire, and a good arc start performance is ensured.

To solve the above problems, a second aspect of the present invention provides an arc start control method comprising step 1 for driving a wire feed motor to start advancing a welding wire, step 2 for determining that a distal end of the welding wire contacts a base material due to advance of the welding wire and short circuit is caused between the welding wire and the base material, step 3 for detecting a feed torque value of the wire feed motor as a short circuit determination torque value at the time of determination of short circuit and proceeding to step 4 if the short circuit determination torque value is a reference torque value or greater, and proceeding to step 5 if the short circuit determination torque value is smaller than the reference torque value, step 4 for retracting the welding wire at a low retract feed speed that maintains the state in which the distal end of the welding wire contacts the base material until the feed torque value drops to a low reference torque value and proceeding to step 5, step 5 for starting retracting the welding wire and separating the distal end of the welding wire from the base material and generating an initial arc between the welding wire and the base material, step 6 for continuing retracting the welding wire while maintaining the initial arc to elongate an arc length, and step 7 for stopping retracting the welding wire and starting advancing of the welding wire to change an state of the arc from the initial arc to a steady arc.

Accordingly, even if an insulating material is adhered to the distal end of the welding wire, the tensed welding wire is relaxed or the lifted welding torch is lowered by retracting the welding wire while maintaining the contact state of the distal end of the welding wire and the base material until the feed torque value drops to the low torque value when the torque value of the wire feed motor is the reference torque value or greater at the time of determination of short circuit. Therefore, re-short circuit is prevented from occurring due to removal of the pressing force of the welding wire, and a good arc start performance is ensured.

To solve the above problems, a third aspect of the present invention provides an arc start control method comprising step 1 for driving a wire feed motor to start advancing a welding wire, step 2 for determining that a distal end of the welding wire contacts a base material due to advance of the welding wire and short circuit is caused between the welding wire and the base material, step 3 for proceeding to step 4 if a state in which welding voltage before the short circuit determination is lower than non-load voltage has continued for a predetermined period or longer, and proceeding to step 5 if a state in which the welding voltage before the short circuit determination is lower than non-load voltage has not continued for a predetermined period or longer, step 4 for starting retracting the welding wire and separating the distal end of the welding wire from the base material without generating an arc and returning to step 1, step 5 for starting retracting the welding wire and separating the distal end of the welding wire from the base material and generating an initial arc between the welding wire and the base material, step 6 for continuing retracting the welding wire while maintaining the initial arc to elongate an arc length, and step 7 for stopping retracting the welding wire and starting advancing of the welding wire to change a state of the arc from the initial arc to a steady arc.

Accordingly, the state of the welding wire or the welding torch can be determined based on whether the state in which the welding voltage value before the short circuit determination has continued for a predetermined period or longer. In other words, same operation and advantages as the invention of the first aspect are obtained without detecting the feed torque of the wire feed motor. Since the feed torque of the wire feed motor does not need to be detected, the structure of the whole circuit is simplified, and the costs are reduced.

DETAILED DESCRIPTION OF THE PREFERRED EMBODIMENTS

First Embodiment

A first embodiment of the present invention will now be described with reference to the attached drawings. A welding apparatus including a welding power source shown in FIG. 1 is identical with the welding device including the welding power source PS illustrated in FIG. 5.

Figure 1:
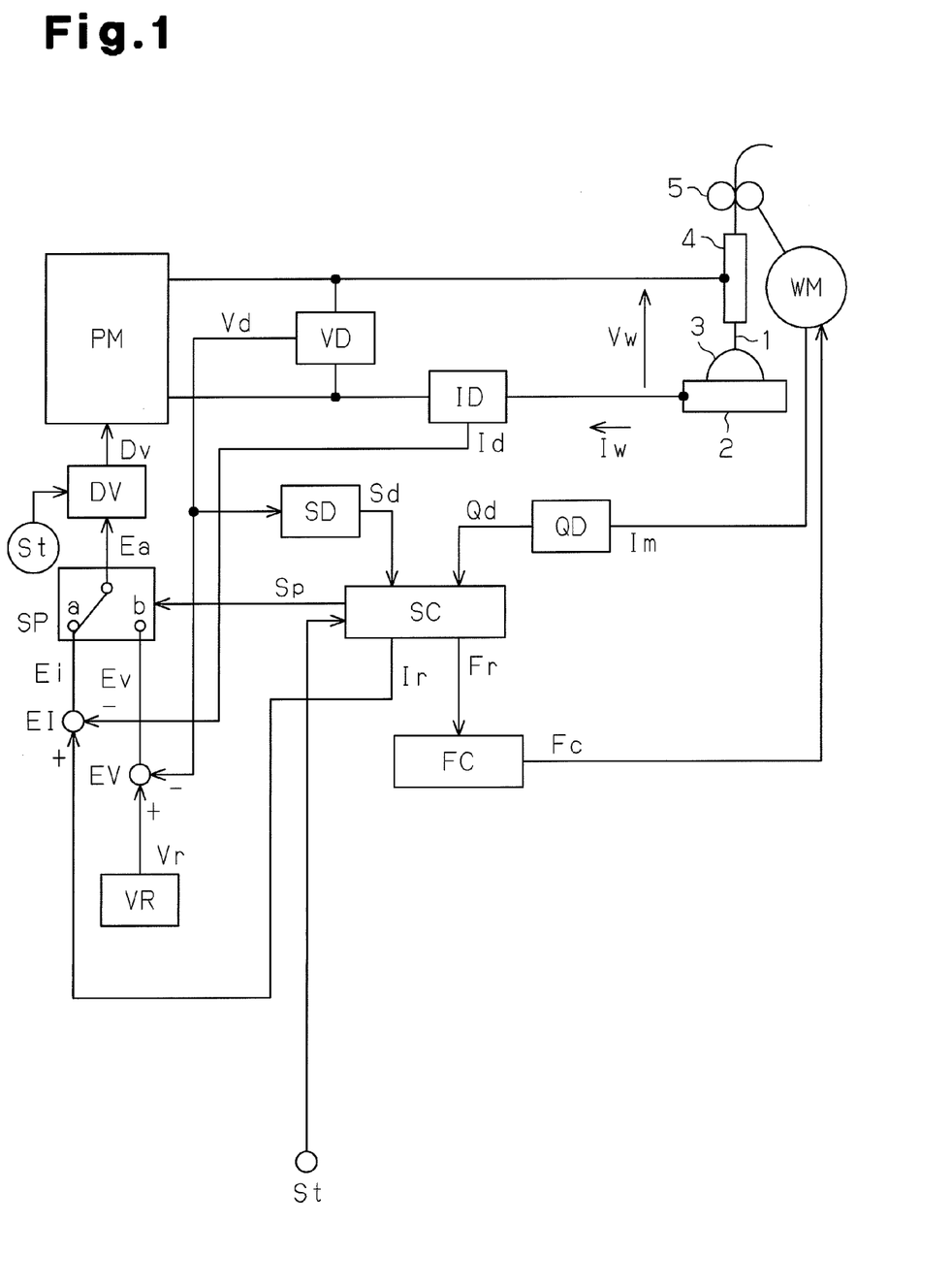
FIG. 1 is a block diagram representing a welding power source according to a first embodiment of the present invention.

As illustrated in FIG. 1, electric power is supplied from a three-phase 200 V commercial power source to a main power source circuit PM. The main power source circuit PM performs output control such as inverter control in accordance with a drive signal Dv, which will be described below. The main power source circuit PM outputs a welding voltage Vw and a welding current Iw to generate an arc 3. The main power source circuit PM is comprised of a primary rectifying circuit, a capacitor, an inverter circuit, a high frequency transformer, a secondary rectifying circuit, and a direct current reactor. The primary rectifying circuit rectifies the commercial power source. The capacitor smoothes the rectified DC voltage. The inverter circuit converts the smoothed DC current to high frequency AC voltage. The high frequency transformer steps down the high frequency voltage to a voltage that is appropriate for welding. The secondary rectifying circuit rectifies the stepped down high frequency AC voltage. The direct current reactor smoothes the rectified direct current. A welding wire 1 is sent through a welding torch 4 to a base material 2 by rotation of a feed roll 5 that is connected to a wire feed motor WM. An arc 3 is generated between a welding torch 4 and the base material 2 and thus welding is carried out.

A voltage detection circuit VD detects the welding voltage Vw and outputs a voltage detection signal Vd. A current detection circuit ID detects the welding current Iw and outputs a current detection signal Id. If the value of the voltage detection signal Vd is smaller than a voltage reference value Vth, it is determined that a short circuit determination circuit SD is in a short circuit state and a short circuit determination signal Sd of a High level is output. When a motor current Im is input from the wire feed motor WM to a feed torque detection circuit QD, the feed torque detection circuit QD computes a feed torque and outputs a feed torque signal Qd.

When a welding start signal St, a short circuit determination signal Sd, and a feed torque signal Qd are sent from the outside to a sequence control circuit SC, the sequence control circuit SC carries out a sequence control which will be described with reference to FIG. 2 and outputs a feed speed setting signal Fr, a current setting signal Ir, and an external characteristic switching signal Sp. A feed control circuit FC outputs a feed control signal Fc for feeding the welding wire at a feed speed that is determined by the feed speed setting signal Fr. The wire feed motor WM is controlled using the feed control signal Fc and outputs the motor current Im that passes through the motor. If the feed speed setting signal Fr is a positive value, the welding wire is advanced. If the feed speed setting signal Fr is a negative value, the welding wire is retracted, and if the feed speed setting signal Fr is zero, the feeding of the welding wire is stopped.

A voltage setting circuit VR outputs a predetermined voltage setting signal Vr. A voltage error amplifier circuit EV amplifies the error between the voltage setting signal Vr and the voltage detection signal Vd and outputs a voltage error amplification signal Ev. A current error amplifier circuit EI amplifies the error between the current setting signal Ir and the aforementioned current detection signal Id, and outputs a current error amplification signal Ei. When the external characteristic switching signal Sp is at the Low level, the external characteristic switching circuit SP outputs the current error amplification signal Ei as the error amplification signal Ea. When the external characteristic switching signal Sp is at the High level, the external characteristic switch circuit SP outputs the voltage error amplification signal Ev as the error amplification signal Ea. Therefore, when the external characteristic switching signal Sp is at the Low level, the external characteristic of the welding power source is a constant current characteristic. When the external characteristic switching signal Sp is at the High level, the external characteristic of the welding power source is a constant voltage characteristic. When receiving the welding start signal St, the driver circuit DV carries out a pulse duration modulation control using the error amplification signal Ea as an input, and outputs a drive signal Dv for driving the inverter circuit in the main power source circuit PM.

An arc start control method according to a first embodiment of the present invention will be described with reference to FIG. 2. FIG. 2 includes timing charts representing the signals for the welding power source illustrated in FIG. 1. Specifically, FIG. 2(A) represents the welding start signal St, and FIG. 2(B) represents the feed speed setting signal Fr. FIG. 2(C) represents the welding voltage Vw, and FIG. 2(D) represents the welding current Iw. FIG. 2(E) represents a wire distal end/base material distance Lw, and FIG. 2(F) represents the feed torque signal Qd. FIG. 2(G) represents the short circuit determination signal Sd. FIG. 2(H) represents the external characteristic switching signal Sp, and FIG. 2(I) represents the current setting signal Ir. The timing charts illustrated in FIG. 2 show the case in that the short circuit timing is delayed after the distal end of the welding wire contacts the base material since the insulating material is adhered to the distal end of the welding wire.

(1) Wire Slow-Down Period from Time Point t1 to Time Point t2

Figure 2:
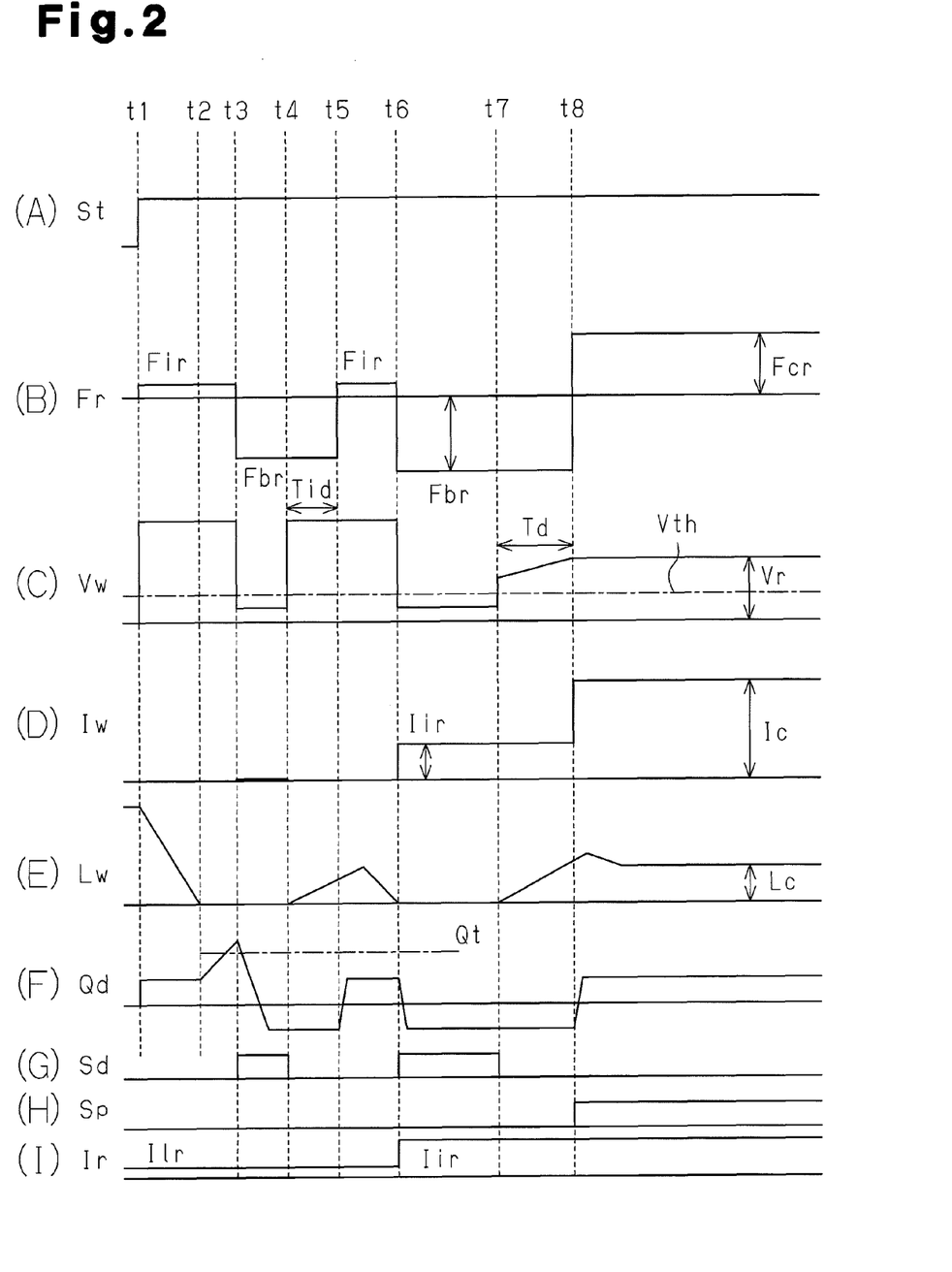
FIG. 2 is a timing chart representing an arc start control method according to the first embodiment of the present invention.

At time point t1, with reference to FIG. 2(A), the welding start signal St is input and reaches a High level. Then, as represented by FIG. 2(B), the feed speed setting signal Fr becomes a slow-down feed speed setting value Fir and the welding wire starts to advance. Simultaneously, output of the drive signal Dv is started and output of the main power source circuit PM is started. Therefore, with reference to FIG. 2(C), the welding voltage Vw is applied. Since the state at time point t1 is the non-load state, the welding voltage Vw is set to a non-load voltage of a high voltage value. After time point t1, the welding wire is advanced and the wire distal end/base material distance Lw gradually decreases as represented by FIG. 2(E).

(2) Contact Period Without Short Circuit State from Time Point t2 to Time Point t3

When the welding wire further advances at time point t2, the distal end of the welding wire and the base material physically contact each other. However, the welding wire contacts the base material with an insulating material adhered to the distal end in between. Therefore, the welding wire is not electrically connected to the base material, and they are not short circuited. Therefore, as shown in FIG. 2(G), the short circuit determination signal Sd is maintained at the Low level, which represents a non-short circuit state. Therefore, as shown in FIG. 2(B), the feed speed setting signal Fr is maintained to be the slow-down feed speed setting value Fir and the welding wire continuously advances. In other words, the welding wire further is advanced in a state where the distal end of the welding wire contacts the base material. Therefore, as described above, the welding wire is tensed by a strong pressing force or the welding torch is lifted by reaction force of the strong pressing force. Simultaneously, the feed torque signal Qd remarkably increases by the pressing force of the welding wire as shown in FIG. 2(F).

(3) Short Circuit Period from Time Point t3 to Time Point t4

At time point t3, a part of the insulating material adhered to the distal end of the welding wire is destroyed and removed by the strong pressing force caused by the advance of the welding wire. Then, the welding wire is electrically connected to the base material and they are short circuited. Accordingly, the short circuit determination signal Sd is changed from the Low level to the High level, which represents a short circuit state as shown in FIG. 2(G). The value of the feed torque signal Qd at this point is the reference torque value Qt or greater as shown in FIG. 2(F). Therefore, the current setting signal Ir is maintained to be the low current setting value Ilr as shown in FIG. 2(I). At this time, the external characteristic switching signal Sp is at the Low level as shown in FIG. 2(H). Therefore, the external characteristic is a constant current characteristic and the welding current Iw corresponding to the low current setting value Ilr is supplied. The low current setting value Ilr is set to be a value that does not maintain an arc of approximately 1 A or less. The value of the feed torque signal Qd at the time of the determination of short circuit (referred to as the short circuit determination torque value) is the reference torque value Qt or greater. Therefore, as shown in FIG. 2(B), the feed speed setting signal Fr becomes a retract feed speed setting value Fbr, and the welding wire starts to be retracted. However, since it takes time to retract the welding wire that is tensed in the feed path, the wire distal end/base material distance Lw is maintained to be zero during this period as shown in FIG. 2(E). In other words, the distal end of the welding wire still contacts the base material and continues to be short circuited. The retracting of the welding wire removes the pressing force of the welding wire acting on the base material. Therefore, the value of the feed torque signal Qd reduces and finally becomes a negative value as shown in FIG. 2(F).

(4) Welding Wire Lift Period from Time Point t4 to Time Point t5

As the welding wire is retracted, the distal end of the welding wire separates from the base material at time point t4. However, the current setting signal Ir is still maintained to be the low current setting value Ilr as shown in FIG. 2(I). Therefore, an initial arc is not generated and a non-load voltage is applied as shown in FIG. 2(C). Thus, as shown in FIG. 2(G), the short circuit determination signal Sd changes from the High level to the Low level, which represents a non-short circuit state. Until a predetermined initial delay period Tid elapses from a time when the short circuit determination signal Sd becomes the Low level, the welding wire continues to be retracted. As a result, the wire distal end/base material distance L2 gradually increases as shown in FIG. 2(E).

(5) Re-Wire Slow-Down Period from Time Point t5 to Time Point t6

When the initial delay period Tid has passed at time point t5, the feed speed setting signal Fr becomes the slow-down feed speed setting value Fir again as shown in FIG. 2(B). As a result, the welding wire is advanced again. Accordingly, the wire distal end/base material distance Lw gradually reduces as shown in FIG. 2(E).

(6) Re-Contact Period from Time Point t6 to Time Point t7

At time point t6, the advance of the welding wire causes the distal end of the welding wire to physically contact the base material. At this time, since the insulating material has already been removed from the distal end of the welding wire, the welding wire is electrically connected to the base material instantly and they are short circuited. Therefore, as shown in FIG. 2(C), the welding wire Vw becomes the low short circuit voltage value that is smaller than the voltage reference value Vth. Therefore, as shown in FIG. 2(G), the short circuit determination signal Sd changes from the Low level to the High level. At this point, since the distal end of the welding wire has just contacted the base material, the distal end of the welding wire is not pressed against the base material. Therefore, the value of the feed torque signal Qd is smaller than the reference torque Qt as shown in FIG. 2(F). Accordingly, as shown in FIG. 2(I), the current setting signal Ir changes from the low current setting value Ilr to the predetermined initial current setting value Iir. The welding current Iw that corresponds to the initial current setting value Iir is supplied as shown in FIG. 2(D). The initial current setting value Iir is set to be a low current value such that an arc of 10 A to 100 A is maintained. Simultaneously, the feed speed setting signal Fr changes from the slow-down feed speed setting value Fir to the retract feed speed setting value Fbr, which is a negative value, as shown in FIG. 2(B). Therefore, the welding wire is retracted. However, due to a delay caused by reversal of rotation of the wire feed motor WM or time necessary for eliminating the play of the welding wire in the feed path, the wire distal end/base material distance Lw is maintained to be zero as shown in FIG. 2(E) during this period. In other words, the distal end of the welding wire still contacts the base material and continues to be short circuited.

(7) Initial Arc Lift Period Td from Time Point t7 to Time Point t8

When the welding wire is retracted at time point t7, the distal end of the welding wire separates from the base material. Then, a current corresponding to the initial current setting value Iir is supplied and the initial arc is caused between the welding wire and the base material. Since the pressing force of the welding wire applied to the base material is small at this point, the welding wire is not suddenly moved and re-short circuit is not caused. Since the welding torch is not lifted, the re-short circuit due to dropping of the welding torch is not caused. In other words, the re-short circuit due to the removal of the pressing force of the welding wire is not caused. If the initial arc is generated, the welding voltage Vw increases to the arc voltage value of several tens of volts and becomes the voltage reference value Vth or more. As a result, as shown in FIG. 2(G), the short circuit determination signal Sd changes from the High level to the Low level. Until the predetermined delay period Td elapses from this point, the retracting of the welding wire continues and the arc length increases to a predetermined distance. When the initial arc is generated, the re-short circuit preventing current may be supplied like the prior art.

(8) Steady Arc State Period After Time Point t8

When the delay period Td has elapsed at time point t8, the feed speed setting signal Fr changes from the retract feed speed setting value Fbr to the predetermined constant feed speed setting value Fcr as shown in FIG. 2(B). Then, the welding wire is advanced again. Simultaneously, as shown in FIG. 2(H), the external characteristic switching signal Sp changes from the Low level to the High level, and the external characteristic changes from the constant current characteristic to the constant voltage characteristic. Therefore, as shown in FIG. 2(C), the welding voltage Vw is controlled based on the voltage value corresponding to the voltage setting signal Vr. As a result, the constant welding current Ic that corresponds to the constant feed speed setting value Fcr is supplied. Then, the state of an arc changes to the constant arc state having the constant arc length Lc as shown in FIG. 2(E).

In the above-described operations, when the distal end of the welding wire contacts the base material and simultaneously short circuited at time point t2 and the value of the feed torque signal Qd is smaller than the reference torque value Qt, the operations of (2) to (5) are omitted and the operations after time point t6 are carried out.

The operations of the sequence control circuit SC of FIG. 1 can be summarized as follows.

(1) Step 1

The feed speed setting signal Fr is set to be the slow-down feed speed setting value Fir and output. Accordingly, the welding wire is advanced based on the slow-down feed speed setting value Fir. Simultaneously, the external characteristic switching signal Sp is set to be the Low level and output. Accordingly, the external characteristic of the welding power source becomes the constant current characteristic.

(2) Step 2

Advance of the welding wire causes the distal end of the welding wire to contact the base material. It is determined that the welding wire is electrically connected to the base material and short circuited, and the short circuit determination signal Sd becomes the High level.

(3) Step 3

The value of the feed torque signal Qd (short circuit determination torque value) when the short circuit determination signal Sd becomes the High level is compared to the reference torque value Qt. If the feed torque signal Qd is equal to or greater than the reference torque value Qt, the process proceeds to step 4 and if the feed torque signal Qd is smaller than the reference torque value Qt, the process proceeds to step 5.

(4) Step 4

The current setting signal Ir is set to be the low current setting value Ilr that is a small value that cannot maintain an arc and output. Simultaneously, the feed speed setting signal Fr is set to be the retract feed speed setting value Fbr and output. Accordingly, the welding wire is retracted and the distal end of the welding wire separates from the base material. At this time, since the value of the current setting signal Ir is small, an arc is not generated. During a period until the initial delay period Tid elapses from a time when it is determined that the distal end of the welding wire separates from the base material according to the determination that the short circuit determination signal Sd drops to the Low level, the welding wire continues to be retracted. Then, the process returns to step 1.

(5) Step 5

The feed speed setting signal Fr is set to be the retract feed speed setting value Fbr and output. Simultaneously, the current setting signal Ir is set to be the initial current setting value Iir of a low current value that maintains an arc and output. Accordingly, when the distal end of the welding wire separates from the base material, a current corresponding to the initial current setting value Iir is supplied and the initial arc is generated between the welding wire and the base material.

(6) Step 6

While maintaining the initial arc, the welding wire continues to be retracted until the delay period Td elapses, thereby elongating the arc.

(7) Step 7

The feed speed setting signal Fr is set to be the constant feed speed setting value Fcr and output. Simultaneously, the external characteristic switching signal Sp is raised to be the High level and output to switch the external characteristic of the welding power source from the constant current characteristic to the constant voltage characteristic. Accordingly, the welding wire is advanced at the constant feed speed setting value Fcr again and the corresponding constant welding current Ic is supplied. Thus, the state of an arc is smoothly changed to the steady arc state.

An instantaneous value, a smoothed value, an average value and other values of the feed torque are used as the short circuit determination torque value. The average value of the feed torque is an average value during the period from time point t2 to time point t3 in FIG. 2. To retract the distal end of the welding wire during the period from time point t3 to time point t4 and the period from time point t6 to time point t7, either the welding wire or the welding torch may be retracted. In the welding apparatus using a robot, parameters such as the slow-down feed speed setting value Fir, the reference torque value Qt, the initial delay period Tid, the retract feed speed setting value Fbr, the delay period Td and other values may be set by a teaching pendant. The reference torque value Qt may be set to be an appropriate value corresponding to at least one of the slow-down feed speed setting value Fir, the diameter of the welding wire, and the material of the welding wire. The initial delay period Tid may be set to be zero.

According to the first embodiment, even if the insulating material is adhered to the distal end of the welding wire, the welding wire is relaxed from the tensed state or the welding torch is lowered from the lifted state by retracting the welding wire when the short circuit determination torque value is the reference torque value or greater. This prevents generation of re-short circuit due to removal of the pressing force of the welding wire. Therefore, a good arc start performance is ensured.

Second Embodiment

Figure 3:
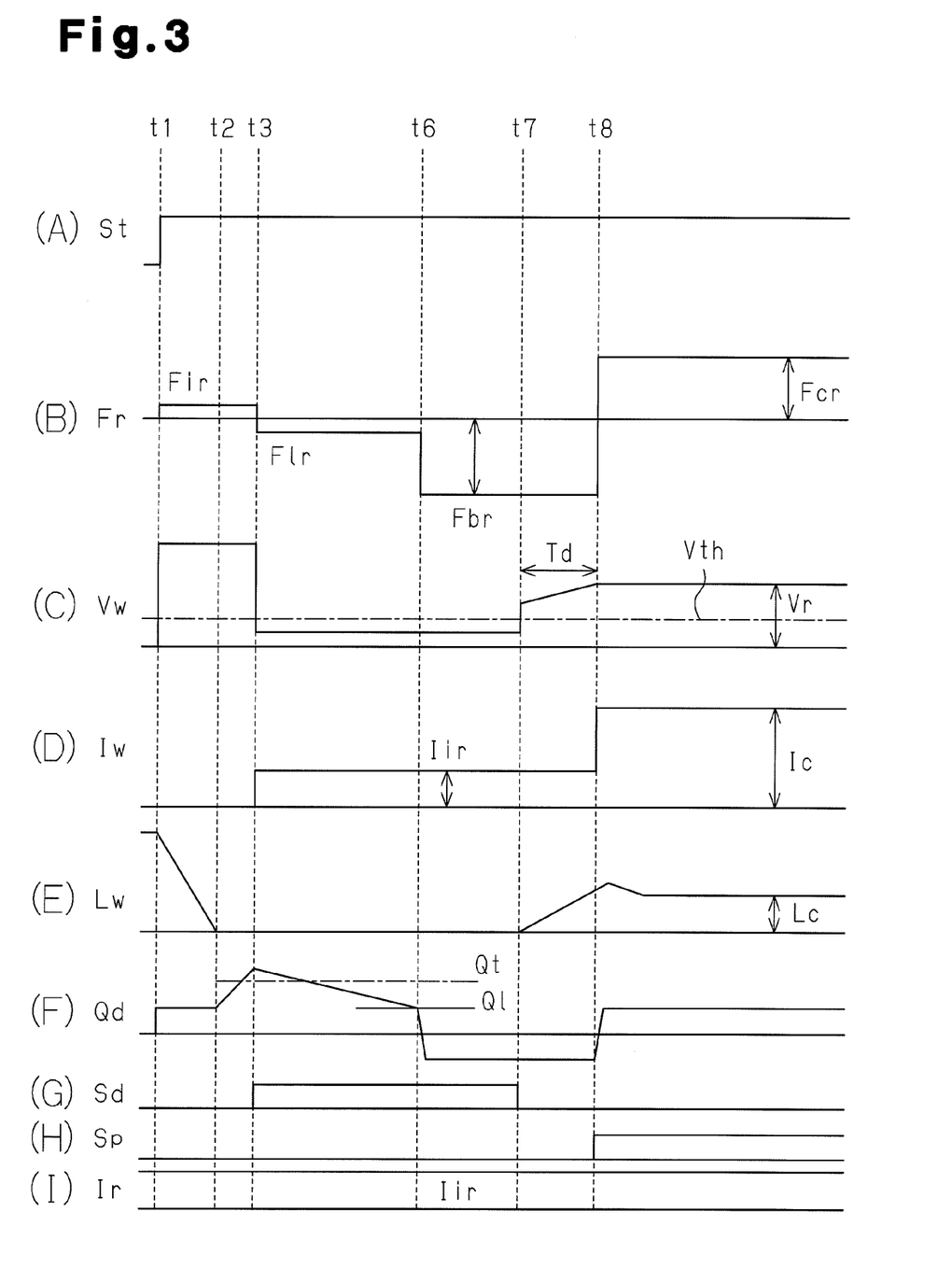
FIG. 3 is a timing chart representing an arc start control method according to a second embodiment of the present invention.

Next, an arc start control method according to a second embodiment of the present invention will be described with reference to FIG. 3. In the second embodiment, operations executed during the period from time point t1 to time point t3 in FIG. 3 are the same as those in FIG. 2, and the explanation thereof is omitted.

(3) Short Circuit Period from Time Point t3 to Time Point t4

At time point t3, a part of the insulating material adhered to the distal end of the welding wire is destroyed or removed by a strong pressing force caused by the advance of the welding wire. Then, the welding wire and the base material are electrically connected to each other and short circuited. The short circuit determination signal Sd is changed from the Low level to the High level, as shown in FIG. 3(G). The value of the feed torque signal Qd (short circuit determination torque value) at this time is the reference torque value Qt or greater, as shown in FIG. 3(F). At this time, the current setting signal Ir is the initial current setting value Iir, as shown in FIG. 3(I), and the external characteristic switching signal Sp is the Low level, as shown in FIG. 3(H). Therefore, the external characteristic is the constant current characteristic and the welding current Iw corresponding to the initial current setting value Iir is supplied. At the time of determination of the short circuit, the value of the feed torque signal Qd is the reference torque value Qt or greater. Therefore, the feed speed setting signal Fr is the low retract feed speed setting value Flr, as shown in FIG. 3(B). As a result, the welding wire is retracted at such a slow feed speed that the distal end of the welding wire does not separate from the base material. Therefore, the welding wire is gradually released from the tensed state by the retracting of the welding wire. As a result, the value of the feed torque signal Qd is gradually reduced, as shown in FIG. 3(F). In this case, the welding wire continues to be retracted until the value of the feed torque signal Qd is reduced to be the predetermined low reference torque value Q1. During this period, it is important that the welding wire is retracted such that the distal end of the welding wire does not separate from the base material. Therefore, the low retract feed speed setting value Flr is set to be low feed speed. The speed of the wire feed motor WM is controlled. However, the torque of the wire feed motor WM may be controlled to be the low reference torque value Q1 during this period.

Operations after time point t3 are the same as those after time point t6 in FIG. 2, and the explanation thereof is omitted. The reference torque value Qt and the low reference torque value Q1 may be set to be an appropriate value corresponding at least one of the diameter of the welding wire and the material of the welding wire. The current setting signal Ir shown in FIG. 3(I) may be set to be the low current setting value Ilr before time point t6 and the current setting signal Ir may be set to be the initial current setting value Iir after time point t6. Accordingly, the initial current is supplied from time point t6. Even if the distal end of the welding wire separates from the base material during a period from time point t3 to time point t4, an arc is not generated between the welding wire and the base material. This prevents melting and joining.

Operations of the sequence control circuit SC according to the second embodiment are described below. In the second embodiment, steps other than step 4 are the same as those in the first embodiment, and therefore the explanation thereof is omitted.

(4) Step 4

The feed speed setting signal Fr is set to be the low retract feed speed setting value Flr and output. The welding wire is retracted at the low retract feed speed that maintains the contact state of the distal end of the welding wire and the base material until the value of the feed torque signal Qd drops to the low reference torque value Q1. Then, the process proceeds to step 5.

According to the second embodiment, even if the insulating material is adhered to the distal end of the welding wire, the welding wire is retracted until the feed torque value is reduced to be the low torque value in the contact state of the distal end of the welding wire and the base material when the short circuit determination torque value is the reference torque value or greater. This cancels the tensed state of the welding wire or the lifted state of the welding torch. Accordingly, this prevents generation of re-short circuit due to the removal of the pressing force of the welding wire. This ensures a good arc start performance.

Third Embodiment

Figure 4:
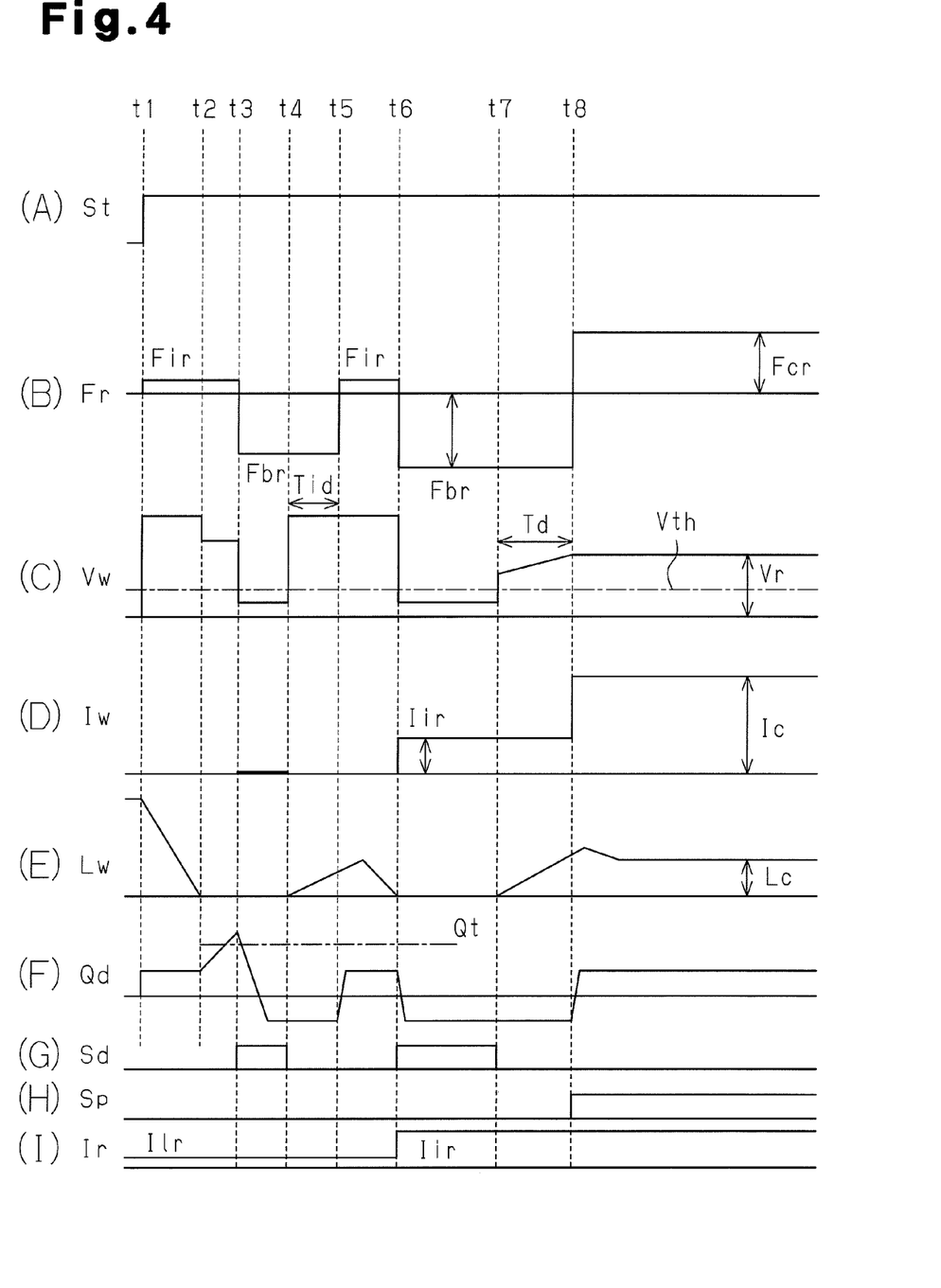
FIG. 4 is a timing chart representing an arc start control method according to a third embodiment of the present invention.

An arc start control method according to a third embodiment of the present invention will be described with reference to FIG. 4. In the third embodiment, operations different from those in FIG. 2 will be described.

During a period from time point t2 to time point t3 while the welding wire is pressed against the base material, a part of insulating material adhered to the distal end of the welding wire is destroyed by the pressing force of the welding wire against the base material, and the resistance value can be transiently greater than the short circuit resistance value. This state continues until the welding wire and the base material are completely short circuited at time point t3. In the transient state, the welding voltage Vw is lower than non-load voltage and higher than the short circuit voltage as shown in FIG. 4(C). In the third embodiment, it is determined that the welding wire is tensed or the welding torch is lifted by determining that the intermediate voltage has been maintained for a predetermined period or longer. In other words, in the first embodiment, the state of the welding wire or the welding torch is determined when the short circuit determination torque value is the reference torque or greater. Instead, in the third embodiment, the state of the welding wire or the welding torch is determined by using the intermediate voltage. Operations other than this operation are the same as those in FIG. 2, and therefore explanation thereof is omitted.

The operations of the sequence control circuit SC in the third embodiment are the same as those in the above embodiments other than step 3.

(3) Step 3

If the state in which the welding voltage value before the short circuit determination is lower than the non-load voltage has continued for a predetermined period or longer, the process proceeds to step 4. On the other hand, if the state in which the welding voltage value before the short circuit determination is lower than the non-load voltage has not continued for a predetermined period or longer, the process proceeds to step 5.

The predetermined period is from 10 to 500 ms. The predetermined period may be set to be an appropriate value according to at least one of the slow-down feed speed setting value Flr of the welding wire, the diameter of the welding wire, and the material of the welding wire.

According to the third embodiment, without detecting the feed torque, the state of the welding wire or the welding torch is determined when the state in which the welding voltage value before the short circuit determination is lower than the non-load voltage has continued for a predetermined period or longer, and the same advantages as the first embodiment are obtained. The detection of the feed torque is not necessary. This simplifies the structure of the whole circuit and reduces the cost.

The invention claimed is:

1. An arc start control method comprising:
 step 1 for driving a wire feed motor to start advancing a welding wire;
 step 2 for determining that a distal end of the welding wire contacts a base material due to the advance of the welding wire and short circuit is caused between the welding wire and the base material;
 step 3 for detecting a feed torque value of the wire feed motor as a short circuit determination torque value at the time of the determination of short circuit, proceeding to step 4 if the short circuit determination torque value is a reference torque value or greater, and proceeding to step 5 if the short circuit determination torque value is smaller than the reference torque value;
 step 4 for starting retracting the welding wire and separating the distal end of the welding wire from the base material without generating an arc, and returning to step 1;
 step 5 for starting retracting the welding wire and separating the distal end of the welding wire from the base material and generating an initial arc between the welding wire and the base material;
 step 6 for continuing retracting the welding wire while maintaining the initial arc to elongate an arc length; and
 step 7 for stopping retracting the welding wire and starting advance of the welding wire to change a state of the arc from the initial arc to a steady arc.

2. An arc start control method comprising:
 step 1 for driving a wire feed motor to start advancing a welding wire;
 step 2 for determining that a distal end of the welding wire contacts a base material due to the advance of the welding wire and short circuit is caused between the welding wire and the base material;
 step 3 for detecting a feed torque value of the wire feed motor as a short circuit determination torque value at the time of the determination of short circuit, proceeding to step 4 if the short circuit determination torque value is a reference torque value or greater, and proceeding to step 5 if the short circuit determination torque value is smaller than the reference torque value;
 step 4 for proceeding to step 5 after retracting the welding wire at a low retract feed speed that maintains the state in which the distal end of the welding wire contacts the base material until the feed torque value drops to a low reference torque value;
 step 5 for starting retracting the welding wire and separating the distal end of the welding wire from the base material and generating an initial arc between the welding wire and the base material;
 step 6 for continuing retracting the welding wire while maintaining the initial arc to elongate an arc length; and
 step 7 for stopping retracting the welding wire and starting advance of the welding wire to change a state of the arc from the initial arc to a steady arc.

3. An arc start control method comprising:
 step 1 for driving a wire feed motor to start advancing of a welding wire;

step 2 for determining that a distal end of the welding wire contacts a base material due to the advance of the welding wire and short circuit is caused between the welding wire and the base material;

step 3 for proceeding to step 4 if a state in which welding voltage before the short circuit determination is lower than non-load voltage has continued for a predetermined period or longer, and proceeding to step 5 if a state in which the welding voltage before the short circuit determination is lower than non-load voltage has not continued for a predetermined period or longer;

step 4 for starting retracting the welding wire and separating the distal end of the welding wire from the base material without generating an arc and returning to step 1;

step 5 for starting retracting the welding wire and separating the distal end of the welding wire from the base material and generating an initial arc between the welding wire and the base material;

step 6 for continuing retracting the welding wire while maintaining the initial arc to elongate an arc length; and step 7 for stopping retracting the welding wire and starting advance of the welding wire to change a state of the arc from the initial arc to a steady arc.

* * * * *